(12) United States Patent
Sekiguchi et al.

(10) Patent No.: US 7,317,572 B2
(45) Date of Patent: Jan. 8, 2008

(54) FRESNEL LENS SHEET, REAR PROJECTION SCREEN AND REAR PROJECTION DISPLAY

(75) Inventors: Hiroshi Sekiguchi, Shinjuku-Ku (JP); Masahiro Goto, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 105 days.

(21) Appl. No.: 10/516,408

(22) PCT Filed: Jun. 3, 2004

(86) PCT No.: PCT/JP2004/007700

§ 371 (c)(1),
(2), (4) Date: Dec. 2, 2004

(87) PCT Pub. No.: WO2004/109391

PCT Pub. Date: Dec. 16, 2004

(65) Prior Publication Data

US 2005/0200953 A1 Sep. 15, 2005

(30) Foreign Application Priority Data

Jun. 3, 2003 (JP) .............................. 2003-158200

(51) Int. Cl.
*G03B 21/60* (2006.01)
*G03B 21/56* (2006.01)
(52) U.S. Cl. ........................ 359/457; 359/453; 359/460
(58) Field of Classification Search ................ 359/453, 359/460, 457, 60, 443
See application file for complete search history.

(56) References Cited

U.S. PATENT DOCUMENTS 5,768,014 A * 6/1998 Lee .............................. 359/457
6,700,713 B2 * 3/2004 Wolfe .......................... 359/742

(Continued)

FOREIGN PATENT DOCUMENTS

JP 49-112621 10/1974

(Continued)

*Primary Examiner*—Diane I. Lee
*Assistant Examiner*—Magda Cruz
(74) *Attorney, Agent, or Firm*—Oliff & Berridge, PLC (57) ABSTRACT

There is provided a Fresnel lens sheet for converging light rays fallen thereon from oblique directions, and capable of reducing the reflection of external light, of enabling displaying images in satisfactory contrast, of suppressing the occurrence of moiré and of being easily manufactured. The Fresnel lens sheet 10 includes: a flat base part 11; a plurality of prisms 12 formed on the entrance surface of the base part 11, a plurality of V grooves 13 formed in the exit surface of the base part 11, and a plurality of wedge-shaped light absorbing parts 14 embedded in the V grooves 13, respectively. Each prism 12 has a refraction facet 12a that refracts light rays fallen thereon and a total-reflection facet 12b that totally reflects light rays fallen thereon. The prisms 12 refract and reflect light rays L1 incident thereon at large incident angles to deflect the light rays L1 for travel in a direction substantially perpendicular to the base part 11. The light absorbing parts 14 have a refractive index lower than that of the base part 11. The inclined surfaces 15a, contiguous with the base part 11, of the light absorbing parts 14 embedded in the grooves 13 of the base part 11 reflect the light rays L1 traveling through the base part 11.

20 Claims, 8 Drawing Sheets

U.S. PATENT DOCUMENTS 6,726,859 B2 * 4/2004 Suzuki et al. ................. 264/2.5
6,822,792 B2 * 11/2004 Goto .......................... 359/456

FOREIGN PATENT DOCUMENTS

| | | |
|---|---|---|
| JP | 56-6230 | 1/1981 |
| JP | 56-134031 | 10/1981 |
| JP | 61-208041 | 9/1986 |
| JP | 63-030835 | 2/1988 |
| JP | 6-332075 | 12/1994 |
| JP | 7-152091 | 6/1995 |
| JP | 8-220519 | 8/1996 |
| JP | 9-34017 | 2/1997 |
| JP | 9-93518 | 4/1997 |
| JP | 2000-352608 | 12/2000 |
| JP | 2002-139799 | 5/2002 |
| JP | 2003-50307 | 2/2003 |
| JP | 2003-66206 | 3/2003 |

* cited by examiner

FRESNEL LENS SHEET, REAR PROJECTION SCREEN AND REAR PROJECTION DISPLAY

This is a National Stage Application of corresponding PCT International Application No. PCT/JPA2004/007700.

TECHNICAL FIELD

The present invention relates to a rear projection display and, more particularly, to a Fresnel lens sheet suitable for application to a rear projection display including a rear projection screen and a projector that projects image light obliquely to the rear projection screen, a rear projection screen provided with the Fresnel lens sheet, and a rear projection display employing the projecting screen.

BACKGROUND ART

A rear projection display, in which a projector projects image light obliquely on a rear projection screen, is provided with a Fresnel lens sheet proposed in JP 61-208041 A (Patent document 1). This Fresnel lens sheet is an optical element for converging the light obliquely fallen on the rear projection screen. The Fresnel lens sheet has an entrance surface provided with prisms having a triangular cross section. Incident light fallen on the entrance surface is refracted at a first facet of each prism, and the refracted light is totally reflected by a second facet of the prism and travels outside through an exit surface opposite the entrance surface. This Fresnel lens sheet is capable of efficiently making the light obliquely fallen on the entrance surface go out through the exit surface. Therefore, the Fresnel lens sheet incorporated into the rear projection display is effective in reducing the size (the depth) of the rear projection display and in forming the rear projection display in a small size.

Figure 9:
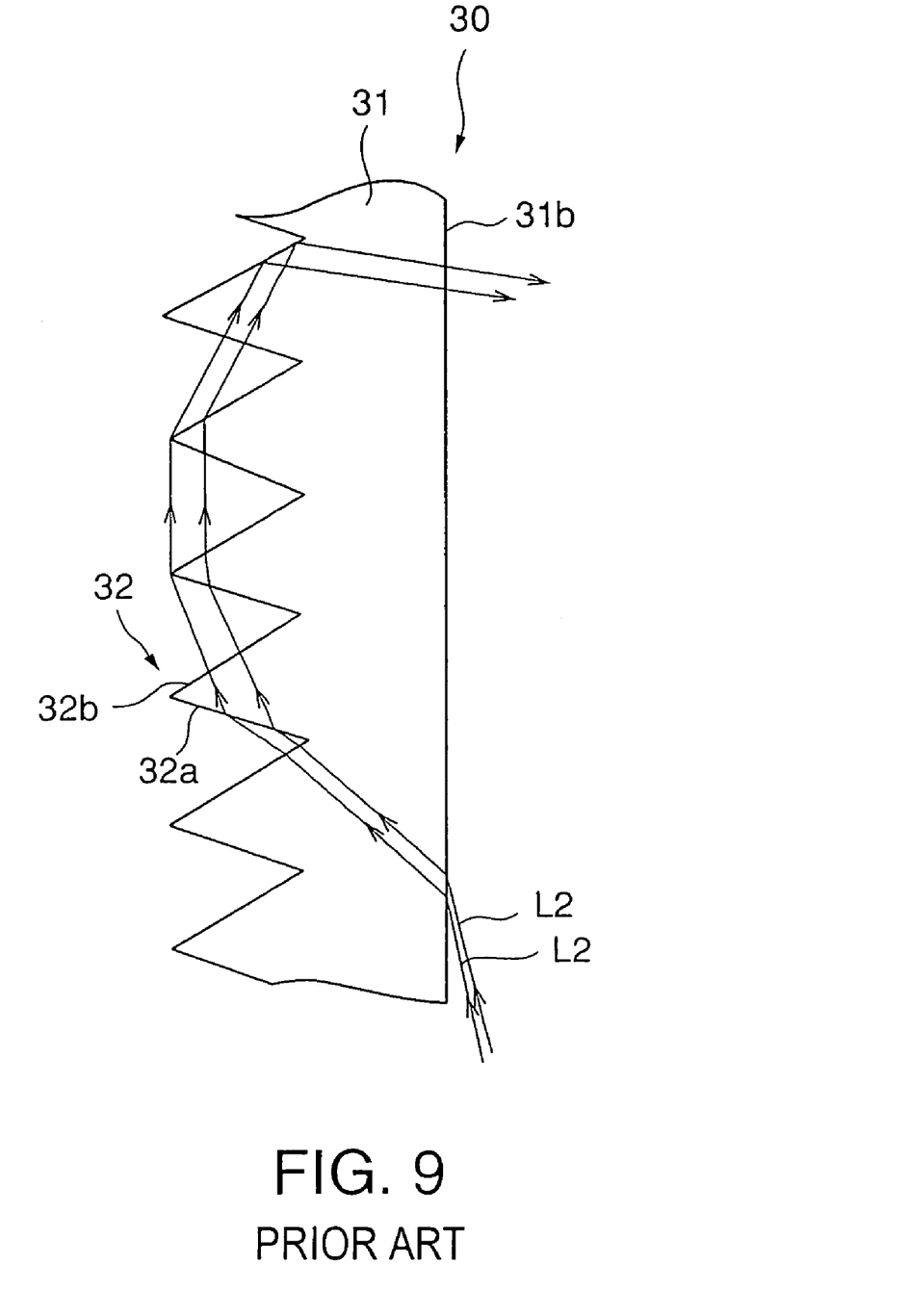
FIG. 9 is a view of assistance in explaining a first problem (problem of reflection of external light) in a conventional Fresnel lens sheet.

However, this Fresnel lens sheet has a problem that contrast in images is liable to be reduced by external light fallen on the exit surface of the Fresnel lens sheet in a bright room or such. Such a problem arises in a Fresnel lens sheet 30 having a base part 31 having an entrance surface provided with prisms 32 each having a refraction facet 32a and a total-reflection facet 32b, and an exit surface 31b as shown in FIG. 9 because some external light rays L2 among those fallen on the exit surface 31b are refracted several times by the refraction facets 32b and total-reflection facets 32b of the prisms 32 and travel outside through the exit surface 31b of the base part 31.

Figure 10:
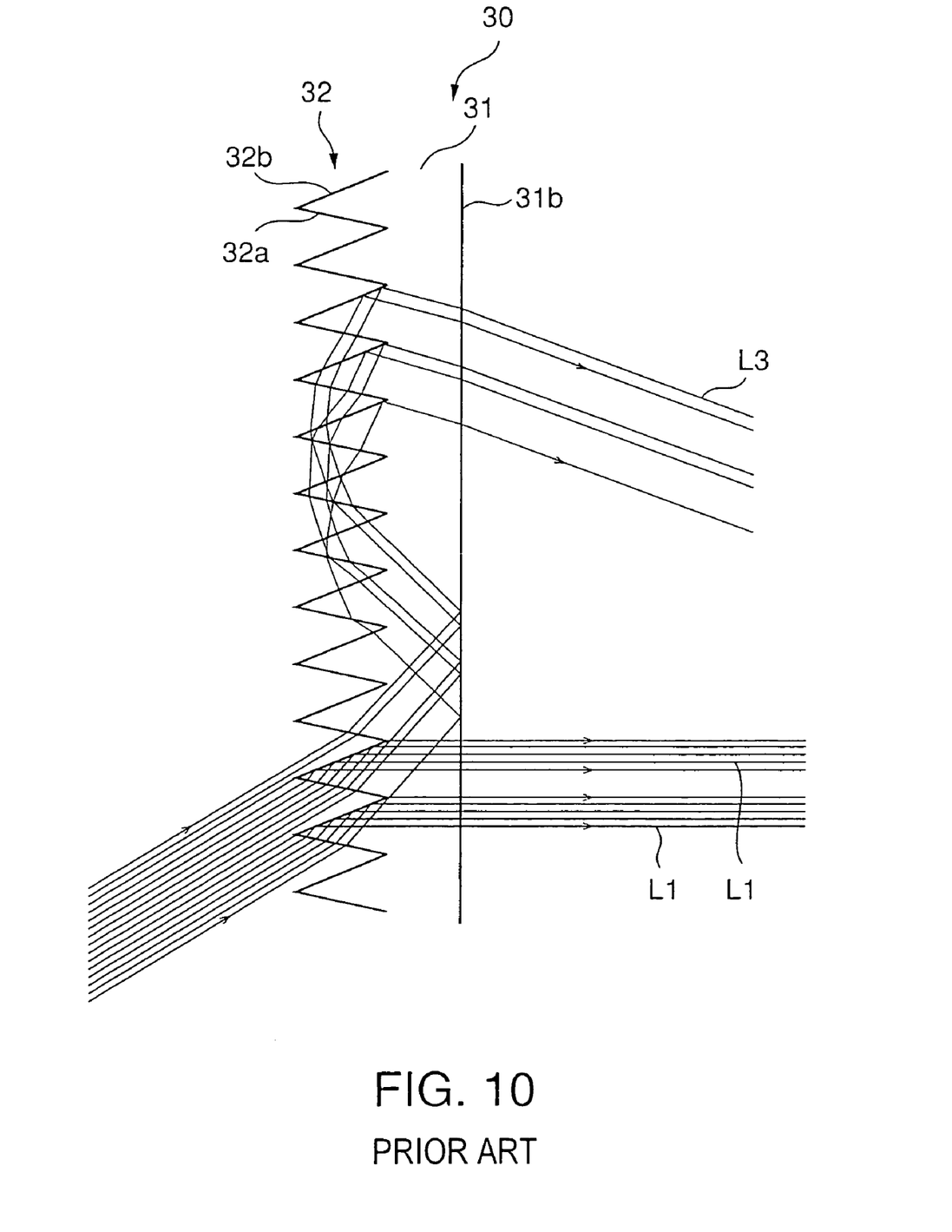
FIG. 10 is a view of assistance in explaining a second problem (problem of a double image) in a conventional Fresnel lens sheet.

In this Fresnel lens sheet 30, some light rays L3 among those fallen at small incident angles on the entrance surface of the base part 31 are not reflected totally by the total-reflection facets 32b of the prisms 32, and the light rays L3 are reflected by the exit surface 31b of the base part 31 and travel outside from different positions on the exit surface 31b as shown in FIG. 10. Consequently, a double image is formed.

Figure 11:
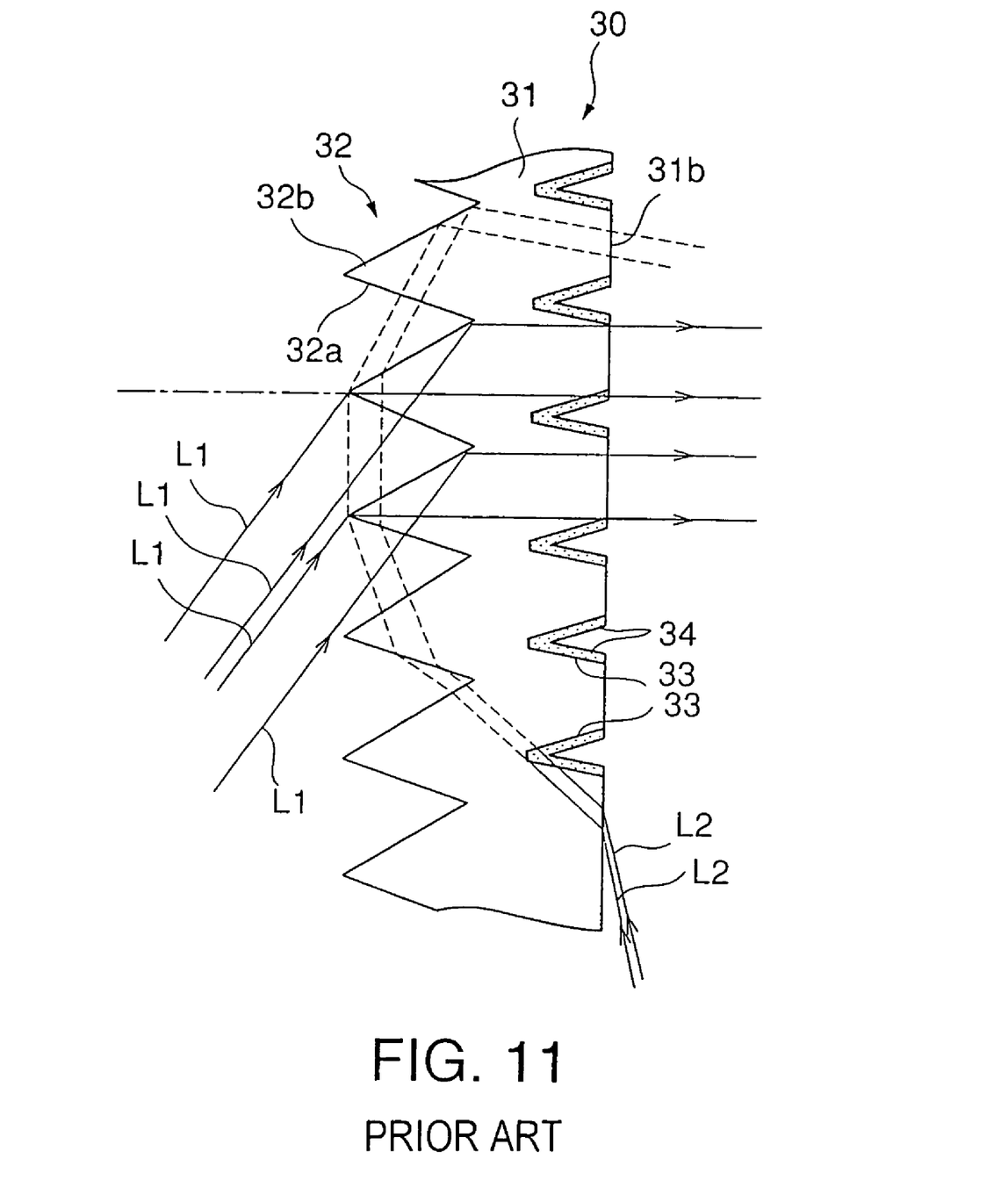
FIG. 11 is a conventional method of solving the problems illustrated in FIGS. 9 and 10.

A known method of solving those problems proposed in JP 63-30835 A (Patent document 2) forms V grooves in regions, through which light rays L1 fallen on the entrance surface of a base part 31 do not pass, of the exit surface 31b of the base part 31 of a Fresnel lens sheet 30, and forms V-shaped light absorbing parts 34 on the slopes of the V grooves 33, respectively, as shown in FIG. 11.

The method mentioned in Patent document 2, however, needs to form the light absorbing parts in regions, through which light rays fallen on the entrance surface of the base part do not pass, of the exit surface of the base part. Therefore, the positional relation between the prisms on the entrance surface of the base part and the light absorbing parts on the exit surface must be properly adjusted. Generally, the pitches of the prisms on the entrance surface are on the order of 0.1 mm. Therefore, the positions of the prisms and those of the light absorbing parts must be determined relative to each other in a positioning accuracy of about 0.01 mm or higher. It is very difficult to manufacture such a Fresnel lens sheet. If the prisms extend parallel to a straight line, the positions of the light absorbing parts parallel to the straight line with respect to a direction perpendicular to the straight line are adjusted. However, if the prisms extend along circular arcs, the positions of the light absorbing parts need to be adjusted with respect to two perpendicular directions. Such positioning is very difficult.

If the positions of the prisms on the entrance surface of the base part and those of the light absorbing parts on the exit surface of the base part are adjusted relative to each other in a low positioning accuracy, moiré occurs due to positioning errors in both a case where the prisms extend parallel to a straight line and a case where the prisms extend along circular arcs.

DISCLOSURE OF THE INVENTION

The present invention has been made in view of the foregoing problems and it is therefore an object of the present invention to provide a Fresnel lens sheet for converging light rays fallen thereon from oblique directions, and capable of reducing the reflection of external light, of enabling displaying images in satisfactory contrast, of suppressing the occurrence of moire and of being easily manufactured, a rear projection screen provided with the Fresnel lens sheet, and a rear projection display.

The present invention provides, as a first aspect, a Fresnel lens sheet including: a flat base part; a plurality of prisms formed on the entrance surface of the base part, each of the prisms having a refraction facet that refracts light rays fallen thereon and a total-reflection facet that totally reflects light rays fallen thereon; a plurality of V grooves formed in the exit surface of the base part; and a plurality of wedge-shaped light absorbing parts embedded in the V grooves, respectively, the light absorbing parts having a refractive index lower than that of the base part; wherein at least some of the light rays refracted and totally reflected by the prisms are reflected by the inclined surfaces that are interfaces between the base part and the light absorbing parts embedded in the grooves of the base part, so that light rays travel outside through regions of the exit surface of the base part, the regions being placed between the adjacent light absorbing parts.

In the first aspect of the present invention, it is preferable that the two inclined surfaces of each of the light absorbing parts are symmetrical with respect to a direction perpendicular to the base part, and a condition expressed by: $\tan^{-1}(2D/W_1) \geq \sin^{-1}(N_1/N_2)$, where $N_1$ is the refractive index of the light absorbing parts, $N_2$ is the refractive index of the base part, D is the depth of the light absorbing parts (length along the thickness of the base part), and $W_1$ is the width of the light absorbing parts (length on the exit surface of the base part along a direction perpendicular to a direction in which the light absorbing parts extend), is satisfied. It is preferable that the ratio $W_1/D$, where D is the depth D of the light absorbing parts (length along the thickness of the base part), and $W_1$ is the width of the light absorbing parts (length on the exit surface of the base part along a direction perpendicular to a direction in which the light absorbing parts extend), is in the range of 0.05 to 0.5.

In the first aspect of the present invention, it is preferable that the two inclined surfaces of each of the light absorbing parts are asymmetrical with respect to a direction perpendicular to the base part, and conditions expressed by: $\tan^{-1} (D/W_3) \geq \sin^{-1} (N_1/N_2)$ and $\tan^{-1} (D/W_4) \geq \sin^{-1} (N_1/N_2)$, where $N_1$ is the refractive index of the light absorbing parts, $N_2$ is the refractive index of the base part, D is the depth of the light absorbing parts (length along the thickness of the base part), $W_3$ is the width of a projection of one of the inclined surfaces of each of the light absorbing parts on the exit surface (length on the exit surface of the base part along a direction perpendicular to a direction in which the light absorbing parts extend), and $W_4$ is the width of a projection of the other inclined surface of each of the light absorbing parts on the exit surface (length on the exit surface of the base parts along a direction perpendicular to a direction in which the light absorbing parts extend), are satisfied. It is preferable that $W_3/D$ is in the range of 0.025 to 0.25 and $W_4/D$ is in the range of 0.025 to 0.25, where D is the depth of the light absorbing parts (length along the thickness of the base part), $W_3$ is the width of a projection of one of the inclined surfaces of each of the light absorbing parts on the exit surface (length on the exit surface of the base part along a direction perpendicular to a direction in which the light absorbing parts extend), and $W_4$ is the width of a projection of the other inclined surface of each of the light absorbing parts on the exit surface (length on the exit surface of the base part along a direction perpendicular to a direction in which the light absorbing parts extend).

In the first aspect of the present invention, it is preferable that portions of the light absorbing parts, within a distance of 0.1 μm from the inclined surfaces contiguous with the base part have an OD (optical density) in the range of 0.01 to 0.12. More concretely, it is preferable that the light absorbing parts entirely have a substantially uniform absorptance and an OD (optical density) per 1 μm in thickness of the light absorbing parts is in the range of 0.1 to 1.2. It is preferable that the light absorbing parts are formed of a material prepared by dispersing spherical light absorbing particles in a transparent base material, and the mean particle size of the spherical light absorbing particles is in the range of 2 to 15 μm.

In the first aspect of the present invention, it is preferable that an antireflection layer is formed on either of the entrance surface and the exit surface of the base part.

The present invention provides, as a second aspect, a rear projection screen including: the Fresnel lens sheet as the first aspect of the present invention; and a lenticular sheet placed on the viewer's side of the Fresnel lens sheet to diffuse light passed through the Fresnel lens sheet.

In the second aspect of the present invention, it is preferable that an antireflection layer is formed on either the entrance surface of the Fresnel lens sheet or the exit surface of the lenticular sheet.

The present invention provides, as a third aspect, a rear projection display including: a rear projection screen provided with the Fresnel lens sheet as the first aspect of the present invention or the rear projection screen as the second aspect of the present invention; and a projector that projects image light rays obliquely on the rear projection screen.

According to the first to the third aspects of the present invention, the plurality of V grooves are formed in the exit surface of the flat base part of the Fresnel lens sheet opposite the entrance surface provided with the prisms, the wedge-shaped light absorbing parts are embedded in the V grooves, and the light absorbing parts have a refractive index lower than that of the base part. In this Fresnel lens sheet, light rays refracted and totally reflected by the prisms formed on the entrance surface of the base part and traveling through the base part are not absorbed by the light absorbing parts and all the light rays go outside through the exit surface of the base part toward the viewer. The light absorbing parts formed in the exit surface of the base part of the Fresnel lens sheet absorb external light. Thus, the incident light incident on the entrance surface of the base part is transmitted at a high transmittance; the reflection of external light can be effectively suppressed and hence contrast in images in a bright room or such can be improved.

According to the first to the third aspects of the present invention, light rays fallen on the entrance surface of the base part and not reflected by the total-reflection facets of the prisms are absorbed by the light absorbing parts formed in the exit surface of the base part. Consequently, even if the light rays fall on the entrance surface of the base part at small incident angles in the range of about 35° to about 45°, formation of double images can be effectively suppressed.

According to the first to the third aspects of the present invention, light rays fallen on the entrance surface of the base part and refracted and totally reflected by the prisms on the entrance surface of the base part are not absorbed by the light absorbing parts formed in the exit surface of the base part regardless of the arrangement of the light absorbing parts, and go outside through the exit surface of the base part. Therefore, the positions of the prisms on the entrance surface of the base part and those of the light absorbing parts in the exit surface of the base part do not need to be adjusted relative to each other. Such construction facilitates manufacture.

According to the first to the third aspects of the present invention, the absorptance of the light absorbing parts are adjusted such that the absorptance of the portions of the light absorbing parts within a distance of 0.1 μm from the inclined surfaces contiguous with the base part is in a predetermined range. Therefore, the amount of light that penetrates through the inclined surfaces into the light absorbing parts and is absorbed by the light absorbing parts among the light totally reflected by the inclined surfaces (total-reflection surfaces) that are interfaces between the light absorbing parts and the base part can be limited to the least unavoidable extent. Consequently, light totally reflected by the inclined surfaces,. contiguous with the base part, of the light absorbing parts is scarcely absorbed by the light absorbing parts while external light fallen on the exit surface of the base part is absorbed, and transmittance can be improved.

BEST MODE FOR CARRYING OUT THE INVENTION

Preferred embodiments of the present invention will be described with reference to the accompanying drawings.

The general configuration of a rear projection display provided with a rear projection screen employing a Fresnel lens sheet in a preferred embodiment of the present invention will be described with reference to FIGS. 2, 3 and 4.

Figure 2:
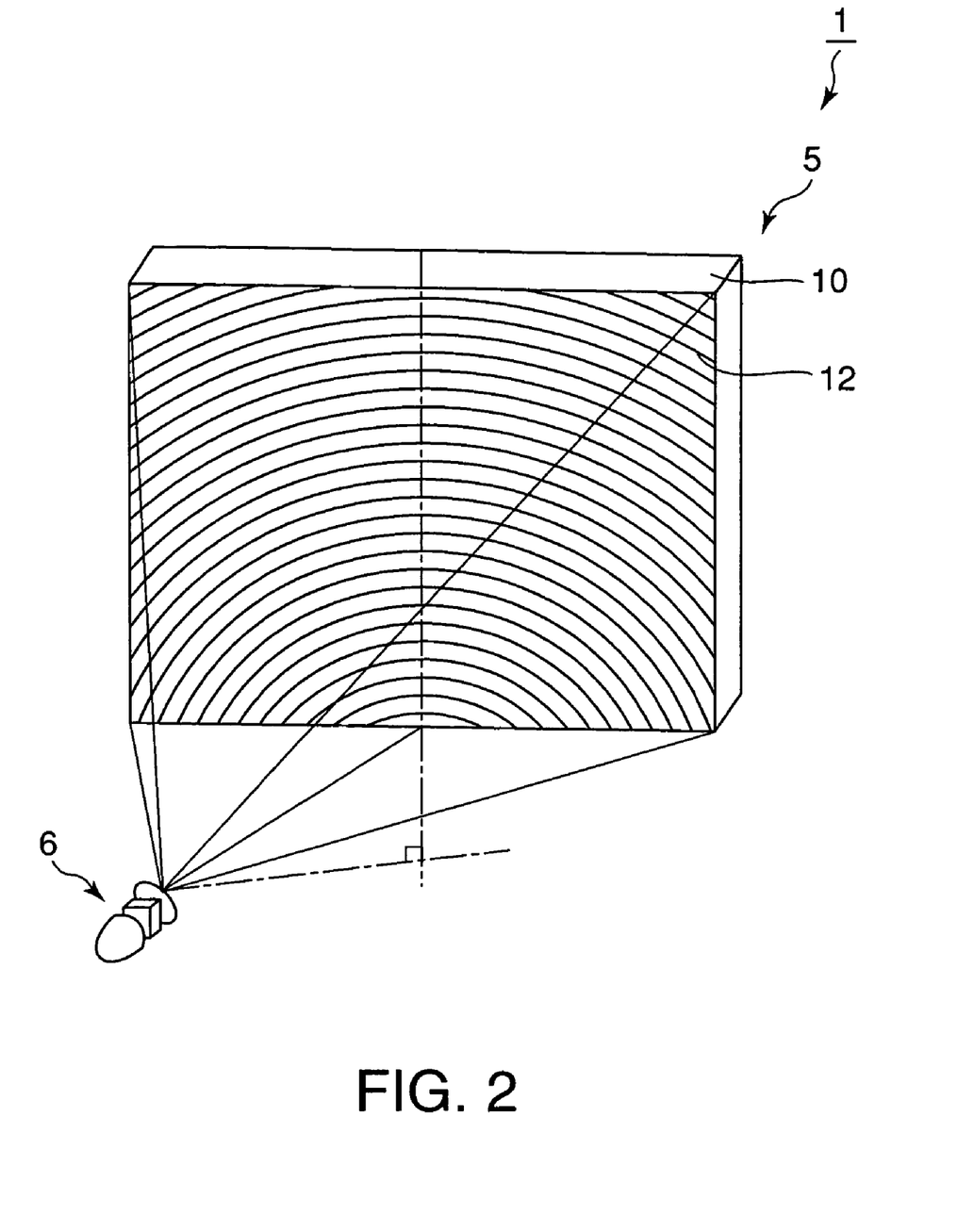
FIG. 2 is a typical view of assistance in explaining a rear projection display provided with the Fresnel lens sheet (rear projection screen) shown in FIG. 1.

Referring to FIG. 2, a rear projection display 1 includes a rear projection screen 5 and a projector 6 that projects image light rays obliquely on the rear projection screen 5. The rear projection screen 5 and the projector 6 are arranged in a cabinet 2, for example, in a positional relation as shown in FIG. 3. In a rear projection display 1 of a configuration shown in FIG. 3, a projector projects image light rays directly on a rear projection screen 5. As shown in FIG. 4, a projector 6 included in a rear projection display 1' of a configuration shown in FIG. 4 may project image light rays toward a deflecting mirror 4 so that the deflecting mirror 4 reflects the image light rays toward a rear projection screen 5.

The rear projection screen 5 emits the image light rays projected thereon by the projector 5 toward the viewer. The rear projection screen 5 is provided with a Fresnel lens sheet 10 for refracting and converging the image light rays projected by the projector 6.

Figure 3:
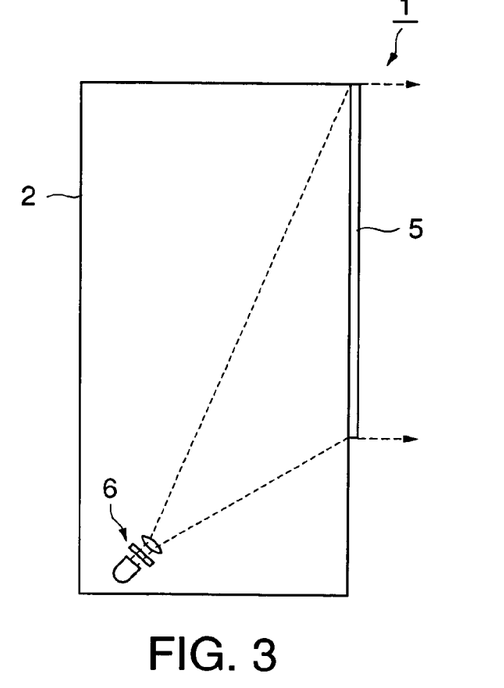
FIG. 3 is view of the rear projection display shown in FIG. 2 in a first configuration.
Figure 4:
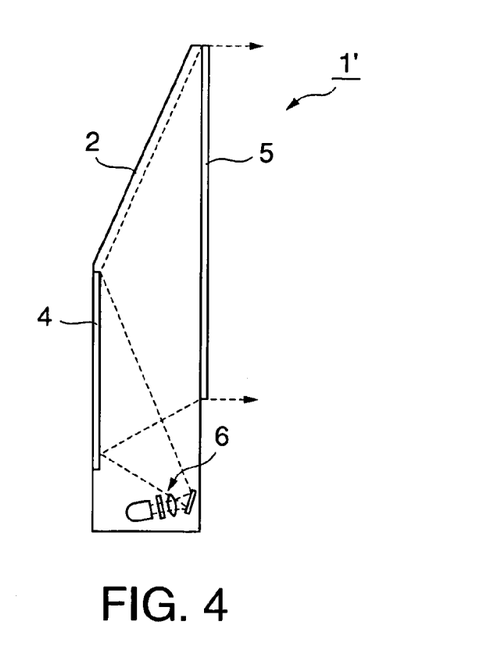
FIG. 4 is view of the rear projection display shown in FIG. 2 in a second configuration.

In the rear projection display 1 shown in FIGS. 2 to 4, the image light rays are projected obliquely on the Fresnel lens sheet 10. Consequently, the image light rays fall on the Fresnel lens sheet 10 at considerably large incident angles. For example, light rays fall on parts in the upper end of the Fresnel lens sheet 10 at incident angles not smaller than about 70°. The Fresnel lens sheet 10 in this embodiment has an entrance surface provided with a Fresnel lens consisting of a plurality of prisms of a triangular cross section each having a refraction facet and a total-reflection facet. Thus, the Fresnel lens sheet 10 is capable of dealing with light rays that fall thereon at such large incident angles.

The Fresnel lens sheet 10 (the rear projection screen 5) employed in the rear projection display 1 shown in FIGS. 2 to 4 will be described with reference to FIG. 1.

Figure 1:
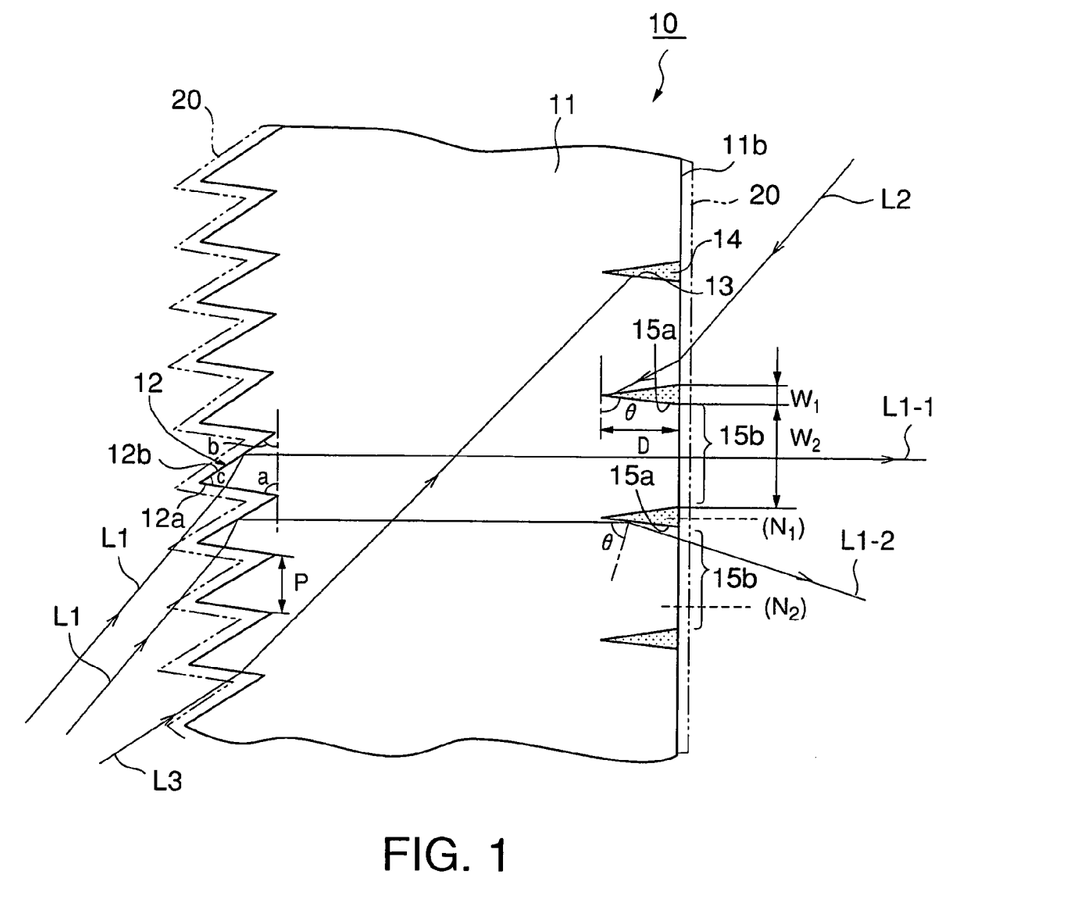
FIG. 1 is a fragmentary sectional view of a Fresnel lens sheet in a first embodiment of the present invention.

Referring to FIG. 1, the Fresnel lens sheet 10 has a flat base part 11, a plurality of prisms 12 formed on the entrance surface of the base part 11, V grooves formed in the exit surface of the base part 11, and a plurality of wedge-shaped light absorbing parts 14 embedded respectively in the grooves 13.

Each prism 12 has a refraction facet 12a at which a light ray fallen thereon is refracted, and a total-reflection facet 12b for totally reflecting the light ray refracted at the refraction facet 12a. The prisms 12 refract and totally reflect light rays L1 obliquely fallen on the prisms 12 at large incident angles so that the light rays L1 travel in a direction substantially perpendicular to the exit surface of the base part 11. The width of each prism 12 (lens pitch p) must be on the order of 1 mm so that the prisms arranged on the screen is visually unrecognizable. Preferably, the width of each prism 12 is on the order of 0.1 mm.

The light rays L1 fall on the prisms 12 at different positions on a plane including the base part 11 at different incident angles, respectively. The respective shapes of the prisms 12 are designed according to incident angles at which the light rays L1 fall thereon. The shape of the prism 12 may be determined by a method that fixes the apical angle c of the prism 12 and changes the angles a and b at which the refraction facet 12a and the total-reflection facet 12b are inclined, respectively, or a method that changes all the angles a, b and c of the prism 12.

The light absorbing parts 14 have a predetermined absorptance and are capable of absorbing external light rays L2 that fall on the exit surface 11b of the base part 11. The light absorbing parts 14 have a refractive index lower than that of the base part 11. Therefore, the inclined surfaces 15a that are interfaces between the base part 11 and the light absorbing parts 14 embedded in the grooves 13 of the base part 11 are able to reflect the light rays L1 refracted and totally reflected by the prisms 12 and traveling through the base part 11.

As shown in FIG. 1, some light rays L1-1 among the light rays L1 refracted and totally reflected by the prisms 12 and traveling through the base part 11 pass through flat regions 15b in the exit surface 11b between the adjacent light absorbing parts 14, and the rest of the light rays L1 fall on the light absorbing parts 14. The light rays L1-2 fallen on the light absorbing parts 14 are reflected by the inclined surfaces 15a, contiguous with the base part 11, of the light absorbing parts 14 and go outside through the flat regions 15b of the exit surface 11b of the base part 11.

Preferably, the light rays fallen on the light absorbing parts 14 are totally reflected by the inclined surfaces 15a, contiguous with the base part 11, of the light absorbing parts 14. Preferably, the critical angle α on the inclined surfaces 15a is smaller than an incident angle θ at which the light rays fall on the inclined surfaces 15a. The incident angle θ is equal to the inclination θ of the inclined surfaces 15a if the inclined surfaces 15a are flat.

The wedge-shaped light absorbing parts 14 (and the V grooves 13) have a cross section resembling an isosceles triangle, and the two side slopes of each of the light absorbing parts 14 are symmetrical with respect to a direction perpendicular to the base part 11. Preferably, a condition expressed by:

$$\theta = \tan^{-1}(2D/W_1) \geq \alpha = \sin^{-1}(N_1/N_2) \qquad (1)$$

where $N_1$ is the refractive index of the light absorbing parts 14, $N_2$ is the refractive index of the base part 11, D is the depth of the light absorbing parts 14 (length along the thickness of the base part 11), and $W_1$ is the width of the light absorbing parts 14 (length on the exit surface 11b of the base part 11 along a direction perpendicular to a direction in which the light absorbing parts 14 extend).

Preferably, the light rays reflected by the inclined surfaces 15a, contiguous with the base part 11, of the light absorbing parts 14 go outside through the exit surface 11b of the base part 11 without being reflected again by the inclined surfaces 15a of the light absorbing parts 14. Preferably, the shape of the light absorbing parts 14 defined by the depth D and the width $W_1$ are adjusted properly according to the width $W_2$ of the flat regions 15b in the exit surface 11b of the base part 11. More concretely, it is preferable that a condition expressed by Expression (2) is satisfied.

$$\tan(2\times\tan^{-1}(W_1/2D))\times D \leq (W_1/2)+W_2 \quad (2)$$

where D is the depth of the light absorbing parts 14, $W_1$ is the width of the light absorbing parts 14, and $W_2$ is the width of the flat regions 15b in the exit surface 11b of the base part 11.

If the depth D of the light absorbing parts 14 is excessively small as compared with the width $W_1$, i.e., if the inclination θ of the inclined surfaces 15a is excessively small, the ratio $N_1/N_2$, where $N_1$ is the refractive index of the light absorbing parts 14 and $N_2$ is the refractive index of the base part 11, must be high. Consequently, choices of materials for forming the base part 11 and the light absorbing parts 14 are narrowed and ability in absorbing external light rays L2 diminishes. Therefore, it is preferable that the ratio $W_1/D$ is in the range of 0.05 to 0.5.

When the condition expressed by Expression (1) is satisfied, the light rays L1-2 fallen on the light absorbing parts 14 are totally reflected by the inclined surface (total-reflection surface) 15a of the light absorbing parts 14 contiguous with the base part 11. However, all the light rays L1-2 are not reflected by the inclined surfaces 15a and some light rays L1-2 penetrate through the inclined surfaces 15a into the light absorbing parts 14. Therefore, if the light absorbing parts 14 have an excessively high absorptance, some of the light rays that are expected to be totally reflected by the inclined surfaces 15a are absorbed undesirably by the light absorbing parts 14. The light absorbing parts 14 having an excessively low reflectance is not preferable because the light absorbing parts 14 having an excessively low absorptance have a low ability in absorbing external light rays L2 fallen on the exit surface 11b of the base part 11.

The depth of penetration of light rays through the total-reflection surfaces into the light absorbing parts 14 is on the order of 1 μm. Therefore, it is preferable that parts of the light absorbing parts 14 within 0.1 μm from the inclined surfaces 15a contiguous with the base part 11 have an OD (optical density) in the range of 0.01 to 0.12. Such a condition can be met by a first method that adjusts the absorptance of the entire light absorbing parts 14 or a second method that adjusts the absorptance of the light absorbing parts 14 locally. The OD of a light absorbing layer can be determined on the basis of the measured transmittance of the light absorbing layer extended on a transparent film. Suppose that the transparent film has a transmittance I, and the transparent film coated with a 1 μm thick light absorbing layer of, for example, the same material as the light absorbing parts 14 has a transmittance $I_o$. Then, $OD=-\log_{10}(I/I_0)$.

More concretely, when the condition is met by the first method, it is preferable that the value of OD for a thickness of 1 μm is in the range of about 0.1 to about 1.2 in case that the width $W_1$ of the light absorbing parts 14 is in the range of several micrometers to several tens micrometers and the depth D of the same in the range of several tens micrometers to about 200 μm. When the light absorbing parts 14 meet such conditions, light rays totally reflected by the inclined surfaces 15a, contiguous with the base part 11, of the light absorbing parts 14 are scarcely absorbed by the light absorbing parts 14 while external light rays L2 fallen on the exit surface 11b of the base part 11 can be satisfactorily absorbed.

The second method may differentiate an outer portion of each light absorbing part 14 around the inclined surface 15a contiguous with the base part 11 and an inner portion of the light absorbing part 14 in absorptance or may form the light absorbing parts 14 of a material prepared by dispersing black, spherical particles (light absorbing particles) having a mean particle size in the range of 2 to 15 μm in a resin as a binder. Since the particles contained in the binder are spherical, it is possible to make the portion within 0.1 μm from the inclined surface 15a contiguous with the base part 11 of the light absorbing parts 14 contain the black particles in a low density. Consequently, as mentioned in connection with the first method, light rays totally reflected by the inclined surfaces 15a, contiguous with the base part 11, of the light absorbing parts 14 are scarcely absorbed by the light absorbing parts 14 while external light rays L2 fallen on the exit surface 11b of the base part 11 can be satisfactorily absorbed.

A method of manufacturing the Fresnel lens sheet 10 will be described.

The base part 11 having the entrance surface provided with the prisms 12 and an exit surface provided with the grooves 13 is molded by using a mold having a cavity of a shape complementary to the base sheet 11 provided with the prisms and the grooves.

A first method of forming the base part 11 provided with the prisms 12 and the grooves 13 may form the base part 11 of a transparent resin, such as an acrylic resin, a styrene resin, a polyester resin, a polycarbonate resin or an acryl-styrene copolymer, by press molding, injection molding or casting using the mold. A second method of forming the base part 11 may form the base part 11 by spreading a radiation-curable resin, such as a UV-curable resin, over a sheet of a transparent resin, such as one of the resins mentioned above, forms the base sheet 11 by using the mold and irradiating the UV-curable resin with UV rays.

Subsequently, the grooves 13 formed in the exit surface of the base part 11 are filled up with a black ink to form the wedge-shaped light absorbing parts 14.

A first light absorbing part forming method of forming the light absorbing parts 14 in the grooves 13 formed in the exit surface of the base 11 may prepare the black ink by mixing a black pigment, such as carbon black, or black resin beads in a transparent resin, namely, a binder, filling up the grooves 13 formed in the exit surface of the base part 11 by a wiping process or the like, and may dry and cure the black ink filling up the grooves 13. A second light absorbing part forming method may prepare the black ink by using a UV-curable resin instead of the transparent resin, namely, the binder, may fill up the grooves 13 formed in the exit surface of the base part 11 by a wiping process or the like, and may cure the black ink filling up the grooves 13 by irradiation with UV rays. A third light absorbing part forming method may separately form a first sheet provided with the prisms 12 and a second sheet provided with the light absorbing parts 14 formed in the V grooves 13 by the first or the second light absorbing part forming method, and may bond the first and second sheets together with an adhesive or a pressure-sensitive adhesive.

Thus, the Fresnel lens sheet 10 as shown in FIG. 1 is manufactured.

In the Fresnel lens sheet 10 in this embodiment, the V grooves 13 are formed in the exit surface, opposite the entrance surface on which the prisms 12 are formed, of the flat base part 11, the wedge-shaped light absorbing parts 14 are embedded in the grooves 13, and the light absorbing parts 14 have a refractive index lower than that of the base part 11. In this Fresnel lens sheet 10, the light rays L1-1 that do not fall on the light absorbing parts 14 among the light rays L1 refracted and totally reflected by the prisms 12 formed on the entrance surface of the base part 11 travel outside through the flat regions 15b between the adjacent light absorbing parts 14 in the exit surface 11b of the base part 11, and the light rays L1-2 that fall on the light absorbing parts 14 can be totally reflected by the inclined surfaces 15a, contiguous with the base part 11, of the light absorbing parts 14 so that the light rays L1-2 travel outside through the flat regions 15b in the exit surface 11b of the base part 11. Consequently, the light rays L1 refracted and totally reflected by the prisms 12 formed on the entrance surface of the base 11 and traveling through the base part 11 are not absorbed by the light absorbing parts 14 and all the light rays L1 travel outside through the exit surface 11b of the base part 11 toward the viewer. In this Fresnel lens sheet 10, the light absorbing parts 14 formed in the exit surface of the base part 11 absorb external light L2. Thus, the base part 11 transmits the incident light rays L1 at a high transmittance, the reflection of external light can be effectively suppressed and hence contrast in images in a bright room or such can be improved.

In this embodiment, the light rays L3 incident on the entrance surface of the base part 11 and not totally reflected by the total-reflection facets 12b of the prisms 12 as shown in FIG. 1 are absorbed by the light absorbing parts 14 formed in the exit surface of the base part 11. Therefore, even if light rays fall on the entrance surface of the base part 11 at small incident angles in the range of about 35° to about 45°, formation of double images can be effectively suppressed.

In this embodiment, the light rays L1 fallen on the entrance surface of the base part 11, refracted and totally reflected by the prisms 12 on the entrance surface of the base part 11 and traveling through the base part 11 are not absorbed by the light absorbing parts 14 regardless of the arrangement of the light absorbing parts 14 in the exit surface of the base part 11, and go outside through the exit surface 11b of the base part 11. Therefore, the positions of the prisms 12 on the entrance surface of the base part 11 and those of the light absorbing parts 14 in the exit surface of the base part 11 do not need to be adjusted relative to each other. Such construction facilitates manufacture.

In this embodiment, the absorptance of the light absorbing parts 14 is adjusted such that the absorptance of portions of the light absorbing parts 14, within a distance of 0.1 μm from the inclined surfaces 15a contiguous with the base part 11 is within a predetermined range. Therefore, the amount of light that penetrates through the inclined surfaces 15a into the light absorbing parts 14 and is absorbed by the light absorbing parts 14 among the light totally reflected by the inclined surfaces (total-reflection surfaces) 15a that are interfaces between the light absorbing parts 14 and the base part 11 can be limited to the least unavoidable extent. Consequently, light totally reflected by the inclined surfaces 15a, contiguous with the base part 11, of the light absorbing parts 14 is scarcely absorbed by the light absorbing parts 14 while external light L2 fallen on the exit surface of the base part 11 is absorbed, and transmittance can be improved.

Although the wedge-shaped light absorbing parts 14 (and the V grooves 13) in this embodiment have a cross section resembling the shape of a symmetrical isosceles triangle, the wedge-shaped light absorbing parts 14 (and the V grooves 13) may have a cross section resembling an asymmetrical triangle and the two inclined surfaces of each light absorbing part 14 may be asymmetrical with respect to a direction perpendicular to the base part 11. It is preferable that conditions expressed by Expressions (3) and (4) are satisfied.

$$\tan^{-1}(D/W_3) \geq \sin^{-1}(N_1/N_2) \tag{3}$$

$$\tan^{-1}(D/W_4) \geq \sin^{-1}(N_1/N_2) \tag{4}$$

where $N_1$ is the refractive index of the light absorbing parts 14, $N_2$ is the refractive index of the base part 11, D is the depth of the light absorbing parts 14 (length along the thickness of the base part 11), $W_3$ is the width of a projection of one of the inclined surfaces of each light absorbing part 14 on the exit surface 11b (length on the exit surface 11b of the base part 11 along a direction perpendicular to a direction in which the light absorbing parts 14 extend), and $W_4$ is the width of a projection of the other inclined surface of each light absorbing part 14 on the exit surface 11b (length on the exit surface 11b of the base part 11 along a direction perpendicular to a direction in which the light absorbing parts 14 extends).

It is preferable to meet conditions expressed by Expressions (5) and (6) to ensure that the light rays reflected by the inclined surfaces 15a, contiguous with the base part 11, of the light absorbing parts 14 go outside through the exit surface 11b of the base part 11 without being reflected again by the inclined surfaces 15a of the adjacent light absorbing parts 14.

$$\tan(2 \times \tan^{-1}(W_3/D)) \times D \leq W_3 + W_2 \tag{5}$$

$$\tan(2 \times \tan^{-1}(W_4/D)) \times D \leq W_4 + W_2 \tag{6}$$

where D is the depth of the light absorbing parts 14, $W_3$ is the width of a projection of one of the inclined surfaces 15a of each light absorbing part 14 on the exit surface 11b, $W_4$ is the width of a projection of the other inclined surface 15a of each light absorbing part 14 on the exit surface 11b, and $W_2$ is the width of the flat regions 15b in the exit surface 11b of the base part 11.

Preferably, the ratio $W_3/D$ is in the range of 0.025 to 0.25 and the ratio $W_4/D$ is in the range of 0.025 to 0.25 to avoid narrowing the scope of choices of materials for forming the base part 11 and the light absorbing parts 14 and to prevent the reduction of ability to absorb the external light rays L2 that fall on the exit surface 11b of the base part 11.

Although the light absorbing parts 14 extend horizontally in the exit surface 11b of the base part 11 to diffuse light in vertical directions in this embodiment, the light absorbing parts 14 may extend vertically in the exit surface 11b of the base part 11 to diffuse light in horizontal directions.

Although the inclined surfaces 15a, contiguous with the base part 11, of the light absorbing parts 14 are flat surfaces having a straight cross section in this embodiment, the inclined surfaces 15a may be curved surfaces having a cross section resembling a segment of a circle or a curve of higher order.

An antireflection coating 20 (FIG. 1) may be formed on either of the entrance surface 11a and the exit surface 11b of the base part 11 of the Fresnel lens sheet 10. The antireflection coating 20 reduces the reflection of light from the surface of the Fresnel lens sheet 10 to further improve contrast in images.

The Fresnel lens sheet 10 may be used alone as the rear projection screen 5 or may be provided with a lenticular sheet on its front surface facing the viewer as shown in FIGS. 5 to 8 to diffuse light passed through the Fresnel lens sheet 10.

Figure 5:
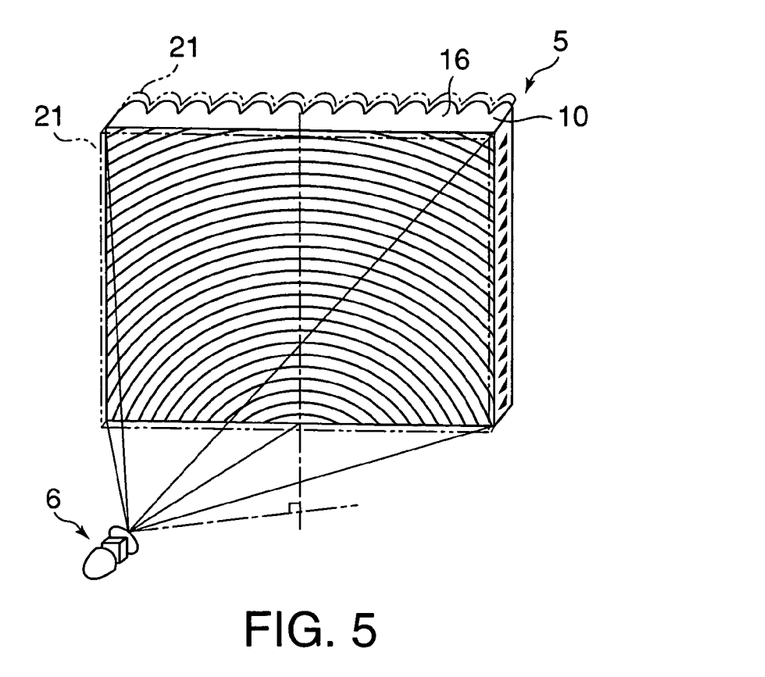
FIG. 5 is a view of a first modification of the Fresnel lens sheet (rear projection screen) included in the rear projection display shown in FIG. 2.

For example, a vertical lenticular lens part 16 shown in FIG. 5 provided with vertical lenticular lenses 16 for horizontally diffusing light may be attached to the front surface facing the viewer of the Fresnel lens sheet 10.

Figure 6:
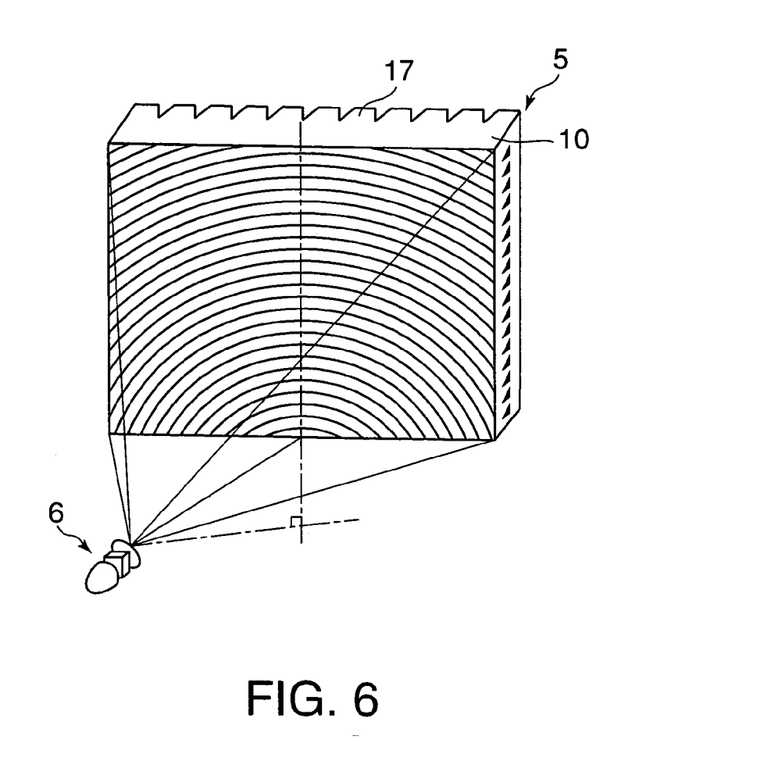
FIG. 6 is a view of a second modification of the Fresnel lens sheet (rear projection screen) included in the rear projection display shown in FIG. 2.

A vertical lenticular lens part 17 shown in FIG. 6 provided with vertical lenticular lenses having a trapezoidal cross section for horizontally diffusing light may be attached to the front surface facing the viewer of the Fresnel lens sheet 10.

Figure 7:
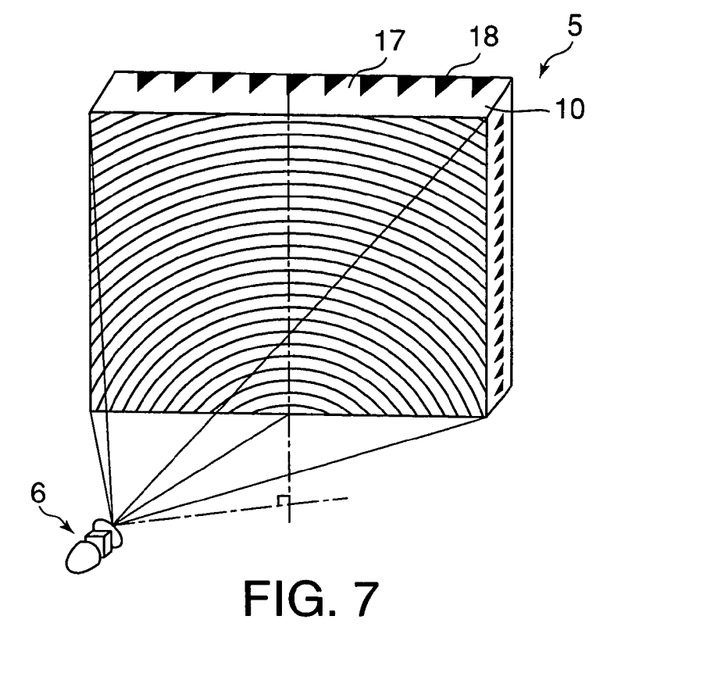
FIG. 7 is a view of a third modification of the Fresnel lens sheet (rear projection screen) included in the rear projection display shown in FIG. 2.

A vertical lenticular lens part 17 shown in FIG. 7 provided with vertical lenticular lenses having a trapezoidal cross section and light absorbing parts 18 similar to the light absorbing parts 14 in function and construction may be attached to the front surface facing the viewer of the Fresnel lens sheet 10. This construction further improves contrast in images.

Figure 8:
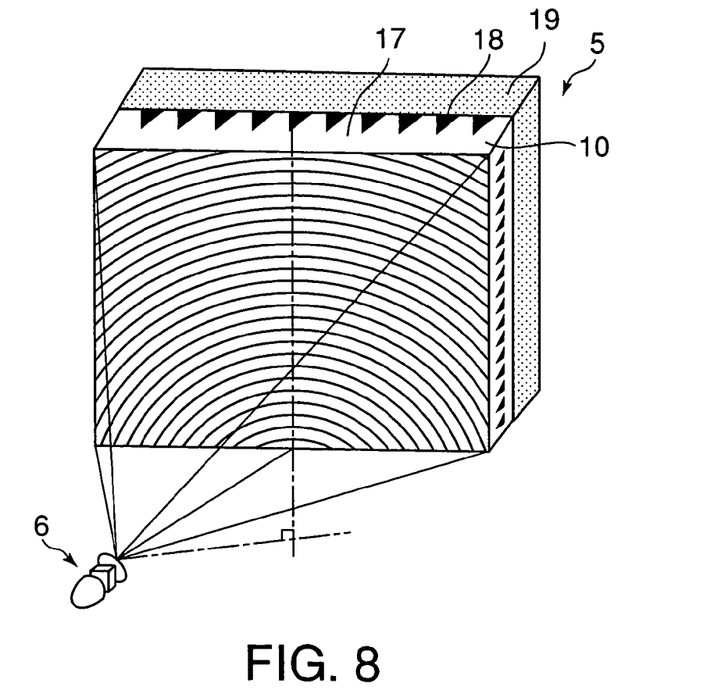
FIG. 8 is a view of a fourth modification of the Fresnel lens sheet (rear projection screen) included in the rear projection display shown in FIG. 2.

In the Fresnel lens sheet 10 shown in FIG. 7, it is preferable that light is not diffused before reaching the vertical lenticular lens part 17 having a trapezoidal cross section and the light absorbing parts 18 to prevent light from being absorbed by the light absorbing parts 18. If light needs to be diffused in both vertical and horizontal directions to prevent the absorption of light by the light absorbing parts 18, it is preferable to attach a diffusing layer 19 to the front surface of the sheet provided with the vertical lenticular lens part 17 having a trapezoidal cross section and the light absorbing parts 18 as shown in FIG. 8. In the Fresnel lens sheets 10 shown in FIGS. 5 and 6, the lenticular lens parts 16 and 17 may contain a diffusing material, or a diffusing layer may be attached to the front surfaces facing the viewer of the sheet respectively provided with the lenticular lens parts 16 and 17 similarly to the Fresnel lens sheet 10 shown in FIG. 10 if light needs to be diffused in both vertical and horizontal directions.

The lenticular lens parts 16 and 17 of the rear projection screens 5 shown in FIGS. 5 to 8 may be formed integrally with the Fresnel lens sheets 10, respectively, or lenticular lens sheets respectively provided with the lenticular lens parts 16 and 17 may be bonded to the Fresnel lens sheets 10, respectively, with a transparent adhesive, a transparent pressure-sensitive adhesive or a transparent UV-curable resin.

An antireflection coating (a coating 21 in FIG. 5) may be attached to either the entrance surface of the Fresnel lens sheet 10 or the surface of the vertical lenticular lens part 16 (17). The antireflection coating reduces the reflection of light from the surface of the rear projection screen 5 to further improve contrast in images.

EXAMPLE

An example of the foregoing embodiment will be described.

Example

A base part having an entrance surface provided with prisms and an exit surface provided with V grooves was formed of a transparent polycarbonate resin having a refractive index of 1.59 by press forming using a mold having a molding surface of a shape complementary to the prisms and the grooves.

The flat base part thus formed was 1016 mm in width, 762 mm in height and 4 mm in thickness. The prisms formed on the entrance surface of the base part had a fixed vertex angle c of 38°. The refraction facets of the prisms were inclined at different angles a and the total-reflection facts of the prisms were inclined at different angles b according to the incident angles in the range of 35° to 71° of incident light rays on the refraction facets, respectively. The prisms were arranged at pitches p of 0.11 mm. The V grooves formed in the exit surface of the base part were formed in a shape complementary to wedge-shaped light absorbing parts to be embedded in the grooves and having a depth D of 50 μm and a width $W_1$ of 14 μm.

The grooves in the exit surface of the base part were filled up with a black ink to form the wedge-shaped light absorbing parts. The black ink was prepared by dispersing black resin beads having a mean particle size of 6 μm in a resin having a refractive index of 1.51 as a binder. The black ink was filled in the grooves by a wiping process and the black ink filling up the grooves were dried and cured.

The wedge-shaped light absorbing parts embedded in the grooves and had a depth D of 50 μm and a width $W_1$ of 14 μm. The pitches ($W_2+W_1/2$) of the light absorbing parts were 0.08 mm.

A vertical lenticular lens part (a refractive index of 1.55) provided with vertical lenticular lenses having a trapezoidal cross section for partly reflecting light in a total reflection mode and for horizontally diffusing light, and a diffusing sheet were attached to the exit surface of the Fresnel lens sheet to build a rear projection screen of a 50 in. in screen size (1016 mm in width, 762 mm in height and 4:3 in aspect ratio) in an example.

Comparative Example

A rear projection screen in a comparative example was made. The rear projection screen in the comparative example was the same in construction as the rear projection screen in the example, except that the former was not provided any grooves and any light absorbing parts in the exit surface of its Fresnel lens sheet.

Evaluation

The rear projection screen in the example and the comparative example were set upright. Image light rays were projected by projectors disposed at a vertical distance of 280 mm downward and at a horizontal distance of 400 mm backward from the middles of the lower ends of the rear projection screens in the example and the comparative example onto the rear projection screens in the example and the comparative example, respectively. The incident angle of the light rays was 35° at the lower end of each rear projection screen and 71° at the upper end of the same.

Images thus displayed on the rear projection screens in the example and the comparative example were observed. The rear projection screen in the example displayed the image in satisfactory contrast in a bright room, did not form any double image and displayed the image in a good quality.

The rear projection screen in the comparative example displayed the image in low contrast in whitish brown, formed a conspicuous double image in a lower region thereof, and displayed the image in an unsatisfactory quality.

The invention claimed is:

1. A Fresnel lens sheet of total-reflection type comprising:
   a flat base part;
   a plurality of prisms formed on an entrance surface of the base part, each of the prisms having a refraction facet that refracts light rays fallen thereon and a total-reflection facet that totally reflects light rays fallen thereon;
   a plurality of V grooves formed in an exit surface of the base part; and a plurality of wedge-shaped light absorbing parts embedded in the V grooves, respectively, the light absorbing parts having a refractive index lower than that of the base part;

wherein at least some of the light rays refracted and totally reflected by prisms are reflected by the inclined surfaces that are interfaces between the base part and the light absorbing parts embedded in the grooves of the base part, so that light rays travel outside through regions of the exit surface of the base part the regions being placed between adjacent light absorbing parts, and wherein two inclined surfaces of each of the light absorbing parts are symmetrical with respect to a direction perpendicular to the base part, and a condition expressed by:

$$\tan^{-1}(2D/W_1) \geq \sin^{-1}(N_1/N_2),$$

where $N_1$ is a refractive index of the light absorbing parts, $N_2$ is a refractive index of the base part, D is a depth of the light absorbing parts (length along a thickness of the base part), and $W_1$ is a width of the light absorbing parts (length on the exit surface of the base part along a direction perpendicular to a direction in which the light absorbing parts extend), is satisfied.

2. The Fresnel lens sheet of total-reflection type according to claim 1, wherein a ratio $W^1/D$, where D is a depth D of the light absorbing parts (length along a thickness of the base part), and $W_1$ is a width of the light absorbing parts (length on the exit surface of the base part along a direction perpendicular to a direction in which the light absorbing parts extend), is in a range of 0.05 to 0.5.

3. The Fresnel lens sheet of total-reflection type according to claim 1, wherein portions of the light absorbing parts, within a distance of 0.1 μm from the inclined surfaces contiguous with the base part have an OD (optical density) in a range of 0.01 to 0.12.

4. The Fresnel lens sheet of total-reflection type according to claim 3, wherein the light absorbing parts are formed of a material prepared by dispersing spherical light absorbing particles in a transparent base material, and a mean particle size of the spherical light absorbing particles is in a range of 2 to 15 μm.

5. The Fresnel lens sheet of total-reflection type according to claim 1, wherein the light absorbing parts entirely have a substantially uniform absorptance and an OD (optical density) per 1 μm in thickness of the light absorbing parts is in a range of 0.1 to 1.2.

6. The Fresnel lens sheet of total-reflection type according to claim 1, further comprising an antireflection layer formed on either of the entrance surface and the exit surface of the base part.

7. A rear projection screen comprising:
the Fresnel lens sheet of total-reflection type according to claim 1; and
a lenticular sheet placed on a viewer's side of the Fresnel lens sheet to diffuse light passed through the Fresnel lens sheet.

8. The rear projection screen according to claim 7, further comprising an antireflection layer formed on either the entrance surface of the Fresnel lens sheet or the exit surface of the lenticular sheet.

9. A rear projection display comprising:
the rear projection screen according to claim 7; and
a projector that projects image light rays obliquely onto the rear projection screen.

10. A rear projection display comprising:
a rear projection screen provided with the Fresnel lens sheet of total-reflection type according to claim 1; and
a projector that projects image light rays obliquely onto the rear projection screen.

11. A Fresnel lens sheet of total-reflection type comprising:
a flat base part;
a plurality of prisms formed on an entrance surface of the base part, each of the prisms having a refraction facet that refracts light rays fallen thereon and a total-reflection facet that totally reflects light rays fallen thereon;
a plurality of V grooves formed in an exit surface of the base part; and
a plurality of wedge-shaped light absorbing parts embedded in the V grooves, respectively, the light absorbing parts having a refractive index lower than that of the base part;

wherein at least some of the light rays refracted and totally reflected by prisms are reflected by the inclined surfaces that are interfaces between the base part and the light absorbing parts embedded in the grooves of the base part, so that light rays travel outside through regions of the exit surface of the base part the regions being placed between adjacent light absorbing parts, and wherein two inclined surfaces of each of the light absorbing parts are asymmetrical with respect to a direction perpendicular to the base part, and conditions expressed by:

$$\tan^{-1}(D/W_3) \geq \sin^{-1}(N_1/N_2)$$

$$\tan^{-1}(D/W_4) \geq \sin^{-1}(N_1/N_2),$$

where $N_1$ is a refractive index of the light absorbing parts, $N_2$ is a refractive index of the base part, D is a depth of the light absorbing parts (length along a thickness of the base part), $W_3$ is a width of a projection of one of inclined surfaces of each of the light absorbing parts on the exit surface (length on the exit surface of the base part along a direction perpendicular to a direction in which the light absorbing parts extend), and $W_4$ is a width of a projection of the other inclined surface of each of the light absorbing parts on the exit surface (length on the exit surface of the base part along a direction perpendicular to a direction in which the light absorbing part extends), are satisfied.

12. The Fresnel lens sheet of total-reflection type according to claim 11, wherein $W_3/D$ is in a range of 0.025 to 0.25 and $W_4/D$ is in a range of 0.025 to 0.25, where D is a depth of the light absorbing parts (length along a thickness of the base part), $W_3$ is a width of a projection of one of inclined surfaces of each of the light absorbing parts on the exit surface (length on the exit surface of the base part along a direction perpendicular to a direction in which the light absorbing part extends), and $W_4$ is a width of a projection of the other inclined surface of each of the light absorbing parts on the exit surface (length on the exit surface of the base part along a direction perpendicular to a direction in which the light absorbing parts extend).

13. The Fresnel lens sheet of total-reflection type according to claim 11, wherein portions of the light absorbing parts, within a distance of 0.1 μm from the inclined surfaces contiguous with the base part have an OD (optical density) in a range of 0.01 to 0.12.

14. The Fresnel lens sheet of total-reflection type according to claim 13, wherein the light absorbing parts are formed of a material prepared by dispersing spherical light absorbing particles in a transparent base material, and a mean particle size of the spherical light absorbing particles is in a range of 2 to 15 μm.

15. The Fresnel lens sheet of total-reflection type according to claim 11, wherein the light absorbing parts entirely have a substantially uniform absorptance and an OD (optical density) per 1 μm in thickness of the light absorbing parts is in a range of 0.1 to 1.2.

16. The Fresnel lens sheet of total-reflection type according to claim 11, further comprising an antireflection layer formed on either of the entrance surface and the exit surface of the base part.

17. A rear projection screen comprising:
the Fresnel lens sheet of total-reflection type according to claim 11; and
a lenticular sheet placed on a viewer s side of the Fresnel lens sheet to diffuse light passed through the Fresnel lens sheet.

18. The rear projection screen according to claim 17, further comprising an antireflection layer formed on either the entrance surface of the Fresnel lens sheet or the exit surface of the lenticular sheet.

19. A rear projection display comprising:
the rear projection screen according to claim 17; and
a projector that projects image light rays obliquely onto the rear projection screen.

20. A rear projection display comprising:
a rear projection screen provided with the Fresnel lens sheet of total-reflection type according to claim 11; and
a projector that projects image light rays obliquely onto the rear projection screen.

* * * * *